United States Patent [19]

Martin

[11] 4,371,198
[45] Feb. 1, 1983

[54] APPARATUS FOR CONNECTING TUBULAR MEMBERS

[76] Inventor: Charles F. Martin, P.O. Box 197, Porter, Tex. 77365

[21] Appl. No.: 135,087

[22] Filed: Mar. 28, 1980

Related U.S. Application Data

[62] Division of Ser. No. 738,609, Nov. 3, 1976.

[51] Int. Cl.³ .............................................. F16L 27/06
[52] U.S. Cl. .................................... 285/165; 285/169; 285/263
[58] Field of Search ................. 285/165, 263, 311, 97, 285/18, 261, 420, 421, 338, 310, 308, 403, 404, 340, 169

[56] References Cited

U.S. PATENT DOCUMENTS

| | | | |
|---|---|---|---|
| 3,271,053 | 9/1966 | Kurachi | 285/340 X |
| 3,427,051 | 2/1969 | White et al. | 285/165 |
| 3,860,271 | 1/1975 | Rodgers | 285/97 |
| 3,874,706 | 4/1975 | Arnold | 285/261 X |

FOREIGN PATENT DOCUMENTS

| | | | |
|---|---|---|---|
| 527928 | 4/1954 | Belgium | 285/403 |
| 745056 | 10/1966 | Canada | 285/404 |
| 1421921 | 11/1965 | France | 285/310 |
| 556,256 | 9/1943 | United Kingdom | 285/97 |

Primary Examiner—Thomas F. Callaghan
Attorney, Agent, or Firm—Browning, Bushman, Zamecki & Anderson

[57] ABSTRACT

Apparatus for connecting tubular members, particularly subsea pipeline sections, the apparatus including, in various combinations, a slip joint, which, following adjustment, can be sealed and fixed against further relative axial movement, a first boltless connection apparatus employing a force imparting system disposed between mating male and female bodies forming the connection apparatus, the force imparting system serving to urge engageable stop surfaces in the male and female bodies into engagement with one another and a second connection apparatus providing relative, universal type movement between components adjoined by the second connection apparatus.

28 Claims, 14 Drawing Figures

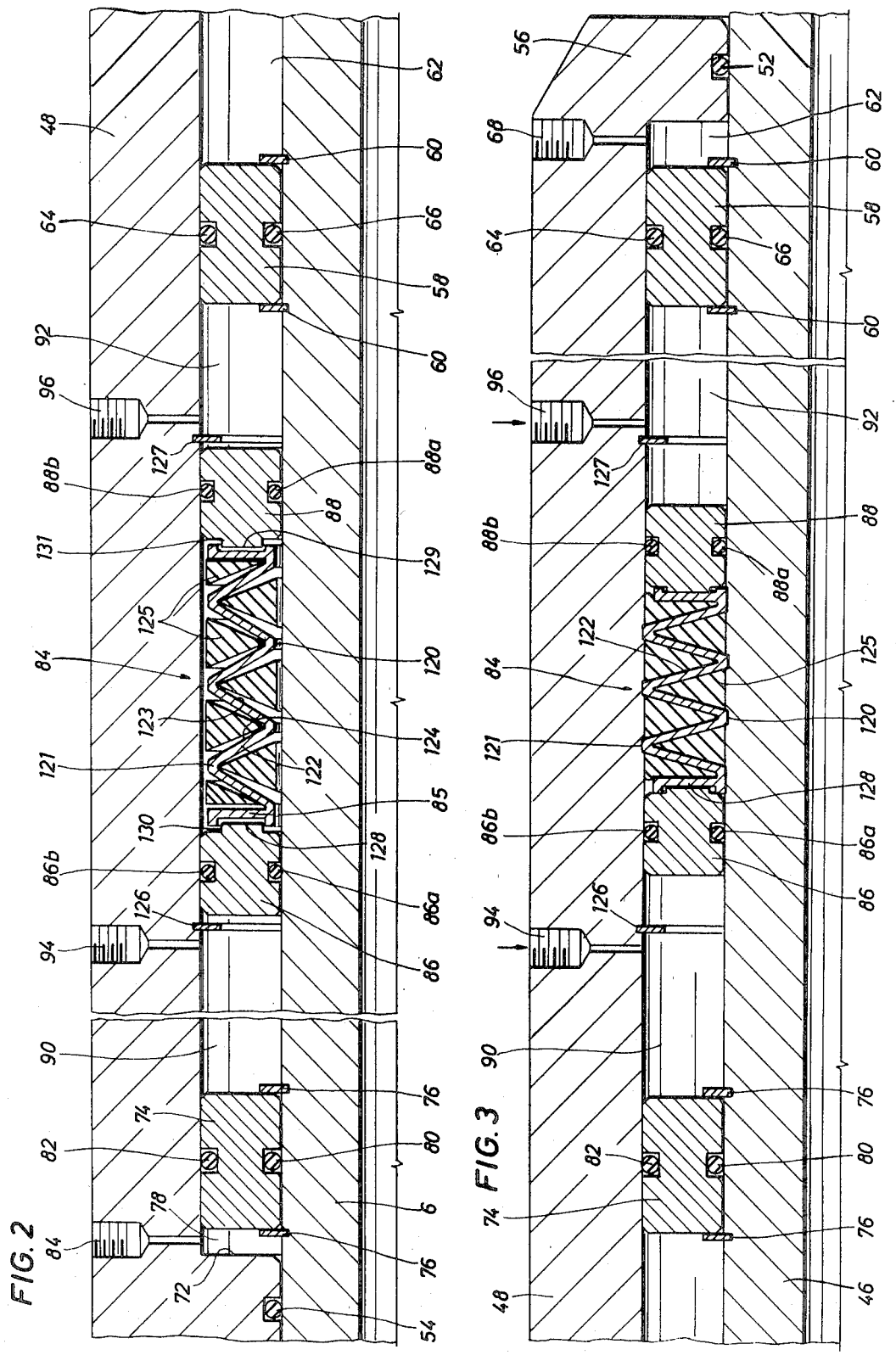

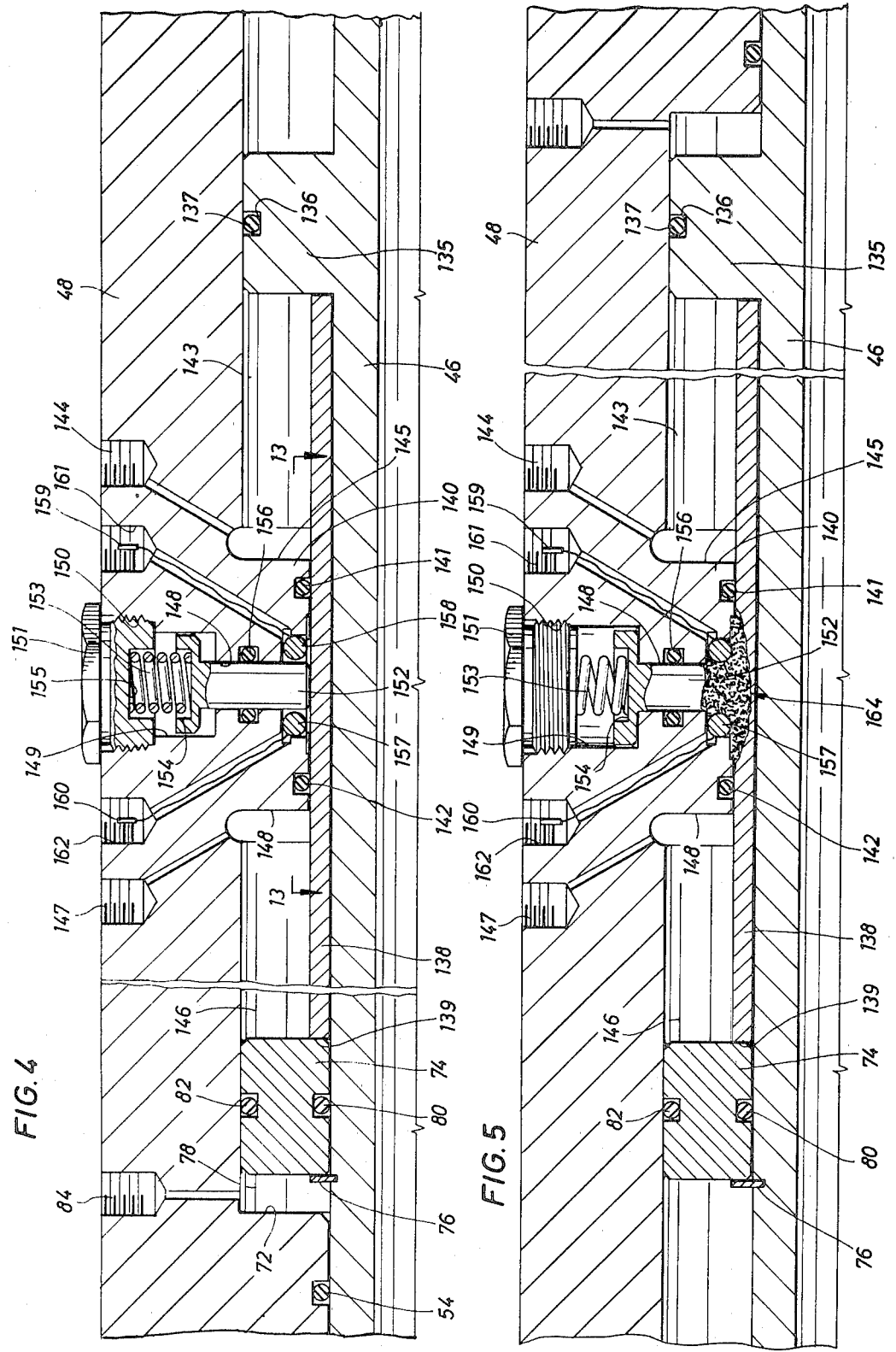

APPARATUS FOR CONNECTING TUBULAR MEMBERS

This is a division, of application Ser. No. 738,609, filed Nov. 3, 1976.

BACKGROUND OF THE INVENTION

The present invention relates to the connection of conduits and the like. More particularly, the present invention relates to the connection of tubular sections in subsea environments and, especially, to the laying or repairing of underwater pipelines such as are used in the transmission of oil and gas from offshore production facilities to onshore storage or treatment facilities.

The laying or repairing of underwater pipelines is, at best, a hazardous, difficult, and expensive operation. In general, many techniques applicable to the laying or repairing of surface or underground pipelines are not practical in such underwater environments. For example, it is common practice in laying surface pipelines to connect adjacent sections of the pipelines by first securing pipe flanges to the adjacent pipe sections followed by bolting the flanges together to bring mating surfaces of the flanges into sealing engagement. Even in laying surface or underground pipelines, connection of pipeline sections using such conventional bolted flanges is time consuming. In underwater environments, it will readily be appreciated that the use of such bolted flanges presents a most difficult if not impossible task.

While conventional welding techniques can be employed to connect adjacent pipeline sections, it is usually necessary to provide an evacuated chamber around the area to be welded, the chamber serving to provide a suitable working environment to carry out the welding. Such chambers, besides being expensive, are difficult to control, and therefore dangerous, and in many cases their use is impractical or impossible.

A problem frequently encountered in the laying or repairing of underwater pipelines is misalignment of adjacent sections of the pipeline which are to be joined. Such misalignment can be caused by undulations on the ocean floor, mishandling of the pipe sections, etc. Such misalignment poses a particularly difficult problem when a section of submerged pipeline is being repaired. As is well known, if a submerged pipeline becomes damaged, it is necessary to either raise the pipeline to the surface and repair the damaged section or effect some kind of subsea repair. In either event, it is generally necessary to remove the damaged section of pipe. If a subsea repair is attempted, it is extremely difficult to provide a repair section of exactly the proper length to replace the damaged section which has been removed.

SUMMARY OF THE INVENTION

It is therefore an object of the present invention to provide a new apparatus for the connection of tubular members.

It is a further object of the present invention to provide an improved apparatus for the connection of tubular members, such as pipeline sections, in underwater environments.

Still another object of the present invention is to provide a slip joint assembly for interconnecting tubular sections.

An additional object of the present invention is to provide a boltless connection apparatus for adjoining tubular members.

Still another object of the present invention is to provide a boltless connection apparatus for adjoining tubular members which permits relative, universal movement between the members.

An important object of the present invention is to provide an apparatus for the connection of misaligned underwater pipeline sections.

The above and other objects of the present invention will become apparent from the drawings, the description given herein and the appended claims.

In one aspect, the above stated objects of the present invention are accomplished by a slip joint comprised of first and second tubular members, one of the members being telescopically slidable and concentrically received in the other of the tubular members. The members are sized to provide an annulus therebetween and there are means disposed in the annulus operative to fix the first and second tubular members against relative axial movement once proper axial positioning has been achieved. In the preferred mode, the means used to fix the relative axial movement of the first and second members includes means to effect a seal between the members. In one particular embodiment, a bridging weld can be formed, in the annulus, between the first and second tubular members, the bridging weld being sufficient to fix the members against relative axial movement. In the more preferred case employing the bridging weld, the weld extends annularly forming a seal between the first and second tubular members.

Another preferred embodiment of the means to fix the relative axial movement of the first and second tubular members employs a gripping member disposed in the annulus, between the first and second tubular members, the gripping member being axially and radially deformable to effect gripping of the first and second tubular members, once the desired relative, axial position has been obtained. In its most preferred mode, the gripping member takes the form of a tubular sleeve disposed in the annulus, a portion of the wall of which is corrugated to provide radially innermost and radially outermost ridges, the sleeve being axially compressible whereby the radially innermost and radially outermost ridges are urged into gripping engagement with the first and second tubular members.

In another embodiment of the present invention, there is provided an apparatus for connecting first and second tubular members comprising a female body having a passageway therethrough and adapted to be connected to one of the tubular members, a male body having a passageway therethrough, one end of the male body being adapted to be connected to the other of said tubular members, the other end of the male body being received in the female body, the male and female bodies having engageable stop surfaces to limit movement of the male body into the female body. There are further provided means disposed between the male and female bodies operative to urge the stop surfaces into engagement. The provision of a means disposed between the male and female bodies of the connection eliminates the need for engageable flange surfaces which have to be bolted together in the conventional manner to secure the adjoining tubular sections to one another.

In still another embodiment of the present invention, there is provided a universal movement type connection apparatus for adjoining first and second tubular members, the connection apparatus comprising a female body having a passageway therethrough, the passageway defining first and second end openings, a male body having a passageway therethrough, one end of the male body adapted to be connected to one of the tubular members, the other end of the male body being received in the first end opening of the female body. The male and female bodies are provided with engageable stop surfaces to limit movement of the male body into the female body. The male body is provided with an external, segmental spherical surface on the end received in the female body and there is further included a socket defining means having a passageway therethrough which provides a socket having a cmplimentary shaped internal, segmental spherical surface for receiving the segmental spherical surface on the male body. The socket defining means is adapted to be connected to the other of the tubular members and received in the second end opening of the female body. The connection apparatus further includes a means for preventing separation of the socket defining means and the male body when the latter is received in the socket while permitting relative, universal movement of the socket defining means and the male body. There are also means disposed between the male and female bodies operative to urge the stop surfaces into engagement. In a preferred embodiment, there is a deformable sealing element disposed between the mated segmental, spherical surfaces, the deformable sealing element serving to rigidly secure and seal the socket defining means and the male body together when the stop surfaces in the male and female body are urged into engagement.

BRIEF DESCRIPTION OF THE DRAWINGS

FIG. 2 is a cross-sectional, partial elevational view of one embodiment of the slip joint of the present invention showing the slip joint in an axially adjustable condition.

FIG. 3 is a view similar to FIG. 2 showing the slip joint of FIG. 2 in a fixed position.

FIG. 4 is a cross-sectional, partial elevational view of another embodiment of the slip joint of the present invention showing the slip joint in an axially adjustable condition.

FIG. 5 is a view similar to FIG. 4 showing the slip joint of FIG. 4 in a fixed position.

DESCRIPTION OF THE PREFERRED EMBODIMENT

In the discussion which follows, particular reference will be made to the joining of tubular sections such as pipe sections used in underwater pipelines. It is to be understood, however, that the invention is not so limited and that the apparatus described herein can be used for adjoining any type of conduits in any type of environments.

Figure 1:
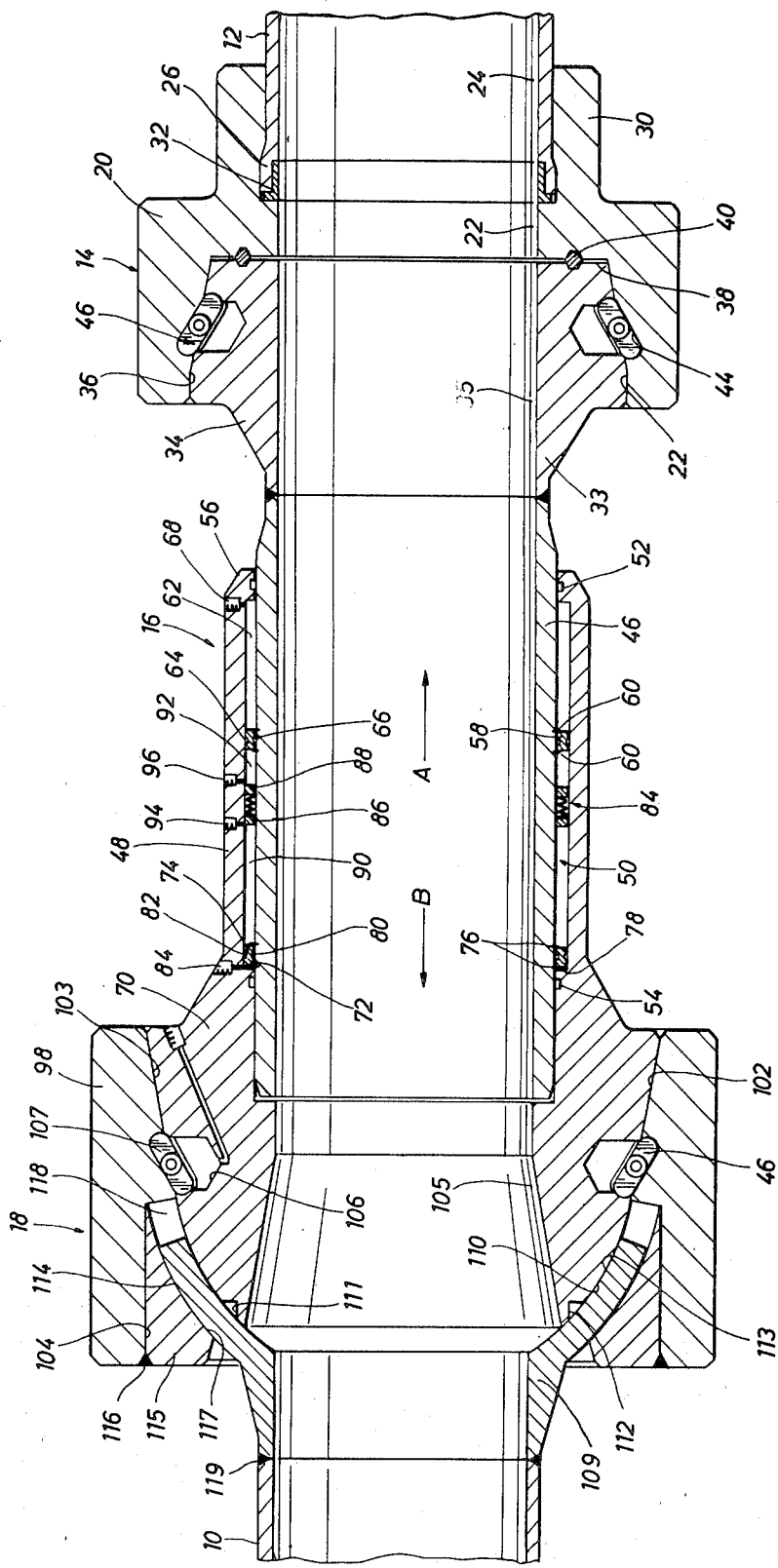
FIG. 1 is a cross-sectional, elevational view showing one embodiment of the slip joint of the present invention having the boltless connection apparatuses of the present invention connected at each end thereof.

Referring first to FIG. 1, there is shown a complete system for adjoining suitable conduits 10 and 12 by means of a first, boltless connection assembly, shown generally as 14, connected to conduit 12, a slip joint, shown generally as 16, having one end connected to first connection assembly 14 and a second, boltless connection assembly, shown generally as 18, connected to conduit 10 and slip joint 16. First connection assembly 14 comprises a female body member 20 having a passageway 22 therethrough, passageway 22 being in open communication with passageway 24 in conduit 12. As can be seen, conduit 12 is secured to female body 20 by means of an external upset portion 26 of conduit 10 being received in an annularly extending recess 28 in an axially projecting neck portion 30 of female body 20. An annular seal member 32 effects fluid tight seal between neck portion 30 of female body 20 and conduit 12.

Received in female body 20 is male body 34 having a passageway 35 therethrough, male body 34 and female body 20 having mating, complimentary shaped surfaces which engage as shown at 36 and 38. An annular seal ring 40 serves to effect a fluid tight seal between male body 34 and female body 20 when male body 34 and female body 20 are forced together in a manner hereinafter described.

Male body 34 is provided with an external, annularly, generally radially extending recess 42 which is in register with an internal, annular, generally radially extending recess 44 in female body 20 when male body 34 and female body 20 are in engagement with one another. A force imparting assembly, shown generally as 46, and described more fully below serves to urge male body 34 and female body 20 together until suitable stop surfaces on male body 34 and female body 20 engage. Such surfaces for example could occur as shown at 36 or at 38.

Secured, by welding, to the end 33 of male body 34 extending out of female body 20 is inner tubular member 46 of slip joint 16. As can be seen, tubular member 46 is telescopically and slidably received in outer tubular member 48, and annulus 50 being formed between members 46 and 48. Outer tubular member 48 terminates in an annular, internal upset portion 56 which slidably engages inner tubular member 46, an annular seal 52 providing fluid tight engagement between portion 56 and member 46. Upset portion 56 cooperates with a sleeve type piston 58 secured to inner tubular member 46 by snap rings 60 to form a first chamber 62, fluid tight sealing of chamber 62 being accomplished by O-rings 64 and 66 on the outer and inner peripheries of sleeve piston 58. A port 68 extending through tubular member 48 provides a means to admit hydraulic fluid into and out of chamber 62.

Outer tubular member 48 is integrally formed with a male head portion 70, described more fully below. Male head portion 70 has an internal annular shoulder 72 which cooperates with a second sleeve piston 74 affixed to inner tubular member 46 by snap rings 76 to form a second chamber 78. Sealing around chamber 78 is accomplished by seal ring 54 between inner tubular member 46 and head portion 70 and inner and outer seal rings 80 and 82 on sleeve piston 74. A port 84 serves to admit hydraulic fluid into and out of chamber 72.

As shown in FIG. 1, slip joint 16 is substantially in its fully shortened position, i.e. inner member 46 telescoped into outer member 48. To expand slip joint 16, hydraulic fluid is supplied through port 84 into chamber 78. The hydraulic pressure acts upon piston 74, which being secured to inner member 46, causes inner tubular member 46 to move in the direction shown by arrow A. The net result is to extend slip joint 16 by moving members 46 and 48 relatively axially apart. To shorten the length of slip joint 16, hydraulic fluid is supplied to chamber 61 via port 68 where it acts upon piston 58 which, being secured to inner member 46, causes inner member 46 to move in the direction shown by arrow B, thus telescoping inner member 46 into outer member 48.

Disposed in annulus 50 is means 84, described more fully below, which is used to fix inner and outer members 46 and 48, respectively, against relative axial movement once desired positioning has been achieved. Means 84 is disposed axially between sleeve pistons 86 and 88. A chamber 90 having a port 94 is formed between pistons 74 and 86 while a second chamber 92 having a port 76 is formed between pistons 66 and 88.

As noted outer tubular member 48 terminates in a male head portion 70. While, as shown, male head portion 70 and tubular member 48 are integrally formed, male head member 70 could be a separate piece welded or otherwise secured to tubular member 48. Male head portion 70, together with other parts to be described, define second connection assembly 18. Second connection assembly 18 also comprises a female portion 98 having an irregular shaped passageway 100 therethrough. As shown, passageway 100 defines a first end opening 102 and a second end opening 104 in female portion 98. Received in the first end opening 102 of female portion 98 is male head portion 70. Male head portion 70, which has a passageway 105 therethrough, has an annular, external, generally radially extending recess 106. Female portion 98 has an annular, internal, generally radially extending recess 107, recesses 106 and 107 being substantially in register when male portion 70 is received in female portion 98. A second force imparting assembly 46 serves to urge male portion 70 and female portion 98 together until suitable stop surfaces on bodies 70 and 98 engage. Such surfaces, for example, could occur as shown at 103.

The end of male portion 70 which extends into female body 98 is provided with an external, segmental spherical surface 110 having an external, annularly extending recess 111 in which is disposed a deformable, preferably metal, seal member 112. Matingly engaging surface 110 is a complimentary formed internal, segmental spherical surface 113, surface 113 being formed in a socket member 109.

An annular wedge ring 115 is received in second end opening 104 of female portion 98 and is secured thereto by weld 116. Wedge ring 115, which serves as a means to prevent separation of socket forming member 100 from male portion 70 has an internal, segmental spherical surface 117. Surfaces 110 and 117 are concentric and provide a recess 118 partially defined by inner and outer substantially concentric, segmental spherical surfaces. The end of socket member 109 received in recess 118 having a like configuration, it can be seen that a ball-socket joint has been formed permitting relative, universal movement of socket forming member 109 and second connection assembly 18. Since socket forming member 109 is adjoined to conduit 10 by weld 119, it can thus be seen that, within the limits of travel of slip joint 16 and the degree of rotational movement of connection assembly 18, conduits 10 and 12 can be adjoined even though substantial misalignment exists therebetween.

Referring now to FIGS. 2 and 3 the function of means 84 shown in FIG. 1 is described. As best seen in FIG. 2, means 84 comprises a tubular sleeve 85, having a generally corrugated wall structure defining alternating radially innermost crests 120 and radially outermost crests 121, crests 120 and 121 being slightly flattened to form gripping feet and being interconnected by web 122. Crests 120 and 121 together with webs 122 serve to define a series of alternating radially inwardly opening grooves 123 and radially outwardly opening grooves 124. Disposed in grooves 123 and 124 is a nongaseous, compressible medium 125, such medium being an elastomeric material such as synthetic rubber or some other resilient compressible medium.

Sleeve 85 is disposed between sleeve pistons 86 and 88 which are fixed against axial movement away from one another by snap rings 126 and 127 disposed in annular recesses in the innerwall of outer tubular member 48. Sleeve pistons 86 and 88 are provided with axially extending projections 128 and 129, respectively, projections 128 and 129 providing circumferentially extending shoulders 130 and 131 which support sleeve 85 and center it to prevent crests 120 or 121 from contacting the walls of the inner or outer tubular members 46 or 48, respectively. It will be seen that in the condition shown in FIG. 2, the slip joint consisting of members 46 and 48 can be axially extended or contracted in the manner described above. When the desired axial positioning of members 46 and 48 is achieved, the slip joint is then locked or fixed in place as follows. Hydraulic fluid pressure is simultaneously supplied to chambers 90 and 92. This forces pistons 86 and 88 toward one another axially compressing sleeve 85. Crests 120 and 121 are deformed radially inwardly and outwardly, respectively, the flattened feet portions thereof being forced into gripping, sealing engagement with inner and outer members 46 and 48, respectively. The presence of the nongaseous compressible medium 125 serves as a hydraulic fluid and prevents waving or wrinkling of the webs 122, thus insuring that the feet of crests 120 and 121 are all forced into engagement with tubular members 46 and 48, respectively. Since generally speaking the corrugated sleeve 85 is made of a metallic material, a metal-to-metal seal is achieved, the seal being affected between tubular member 46 and crests 120 on one hand and tubular member 48 and crests 121 on the other hand. It is to be observed that elastomeric material 125 acts only as a hydraulic fluid, sealing being accomplished by the metal-to-metal engagement described above. It will thus be seen that means 84 which may generally be described as a bellows seal provides a means for not only fixing members 46 and 48 against relative axial motion but also provides an annular metal-to-metal seal.

It will be appreciated that tubular sleeve 85 need not have a complete corrugated wall structure, for example, tubular sleeve 85 could be made with axial ends which were noncorrugated and which were connected by a central web having a corrugated wall structure. In such event, it would generally be necessary to make the noncorrugated portions of tubular sleeve 85 of substantial wall thickness to prevent wrinkling or collapsing thereof and thereby interfere with the gripping and sealing mechanism afforded by crests 120 and 121.

While in the embodiment shown in FIGS. 2 and 3, the gripping feet are shown as being integral and forming an actual part of the corrugated wall structure of tubular sleeve 85, it is to be understood that separate gripping feet consisting of annular rings could be secured to the crests 120 and 121 of sleeve 85. It will also be appreciated that, whereas with annularly extending gripping feet, a metal-to-metal seal is formed, if it is desired to merely fix the relative axial position of inner member 46 and outer member 48, it would only be necessary to have circumferentially spaced feet attached to the apices. Such spaced feet, while not effecting an annular, metal-to-metal seal, would nonetheless provide positive gripping between inner and outer members 46 and 48, respectively, and thereby fix the relative axial movement of such members.

Figure 13:
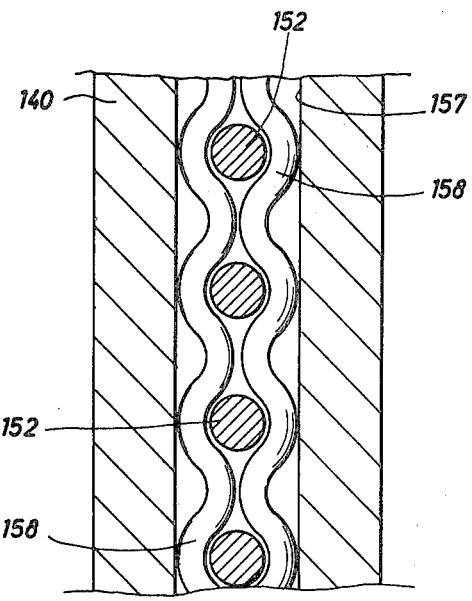
FIG. 13 is a view taken along the lines 13—13 of FIG. 4.

Reference is now made to FIGS. 4, 5 and 13 for a description of another embodiment of the slip joint of the present invention and, more particularly, to a means for fixing the relative axial disposition of the inner and outer tubular members which form the slip joint. Inner tubular member has an external, annularly extending upset end portion 135 with an external, annular recess 136 formed therein. A seal ring 137 provides a seal between upset portion 135 and the interior of outer tubular member 48. Secured and preferably welded, to inner tubular member 46 is a brazing sleeve 138. Brazing sleeve 138, whose purpose will be discussed more fully hereafter, is preferably a high copper content, fleuless alloy. However, it is to be understood that brazing sleeve 138 can be made from many materials which will serve to provide a weld in the manner hereinafter described. Inner tubular member 46 is also provided, as in the case shown in FIGS. 2 and 3, with a sleeve piston 74. Piston 74 is secured to inner member 46 by snap ring 76 and the end 139 of brazing sleeve 138.

Outer tubular member 48 is provided with an internal, annular radially extending rib 140. High temperature seal rings 141 and 142 provide sealing between rib 140 and brazing sleeve 138. It will thus be seen that two chambers 143 and 146 are formed between outer tubular members 48 and inner tubular member 46. Annular chamber 143 has a port 144 and is formed between upset portion 135 and one axial end surface 145 of rib 140. Chamber 146 has a port 147 and is formed between piston 74 and the other axial end surface 148 of rib 140. It will be apparent that adjustment of the slip joint can be accomplished either by admitting hydraulic fluid to chamber 143 or 146, the admission of hydraulic fluid to chamber 143 resulting in the axial lengthening of the slip joint, the admission of hydraulic fluid to chamber 146 resulting in the shortening of the slip joint.

Rib 140 is provided with a series of circumferentially spaced radially extending cylindrical bores 148, bores 148 being in open communication with counterbores 149 through outer tubular member 48. Counterbores 149 are threaded as at 150 to receive a threaded plug 151. Disposed in bores 148 are cylindrical plungers 152, plungers 152 being biased against sleeve 138 by means of a compression spring 153 disposed between plugs 151 and the head of plungers 152. It can be seen that the one end of compression spring 153 is received in socket 154 in the head of plunger 152 while the other end of spring 153 is received in socket 155 in threaded plug 151. Sealing between the plunger 152 and rib 140 is accomplished by O-ring seal 156.

Annular rib has a circumferentially extending, inwardly opening recess 157. An induction heating wire 158 is disposed in recess 157, electrical connection between wire 158 being effected by leads 159 and 160 extending through ports 161 and 162, respectively, in outer tubular member 48.

The relative disposition of induction heating wire 158 to recess 157 and plungers 152 is best seen with reference to FIG. 13. As can be seen, induction heating wire 158 is disposed so as to substantially encircle, in a coil like relationship, the portions of plungers 152 closely adjacent brazing sleeve 138.

With particular reference to FIG. 5, it will be seen that by application of electrical power of the desired frequency to induction heating wire 158, the end of plunger 152 closely adjacent brazing sleeve 138 can be heated to a temperature sufficient to effect fusion of that portion of brazing sleeve 138 in abutment and closely adjacent plunger 152. Because of the circumferential spacing of plungers 152, there is effectively formed an annular, molten ring of fused material of brazing ring 138. As fusion of brazing sleeve 138 occurs, plunger 152 is urged radially inwardly by the action of spring 153. By properly sizing recess 157, the amount of fused brazing sleeve 138 displaced by plungers 152, will substantially fill recess 157. There will thus be formed an annularly extending bridging weld shown generally as 164 in FIG. 5, which serves not only to axially fix inner and outer tubular members 46 and 48, respectively, against relative movement, but also forms a seal between annular rib 140 and brazing sleeve 138 and hence inner and outer tubular members 46 and 48, respectively.

It will be understood that if it is only desired to fix members 46 and 48 against relative axial movement, a complete annular bridging weld need not be formed between rib 140 and inner tubular member 46. In other words, circumferentially spaced spot welds could be employed which would serve to fix members 46 and 48 against any relative movement but would not provide a seal as in the case described above.

Figure 6:
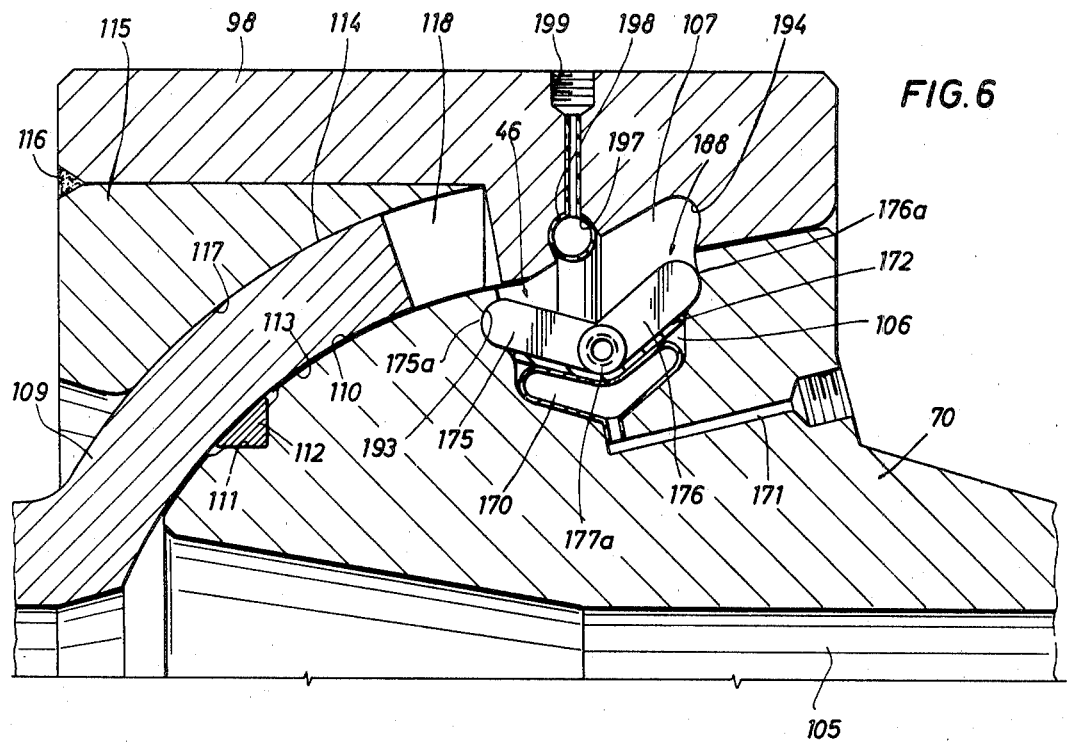
FIG. 6 is a cross-sectional, partial elevational view showing the universal type connection apparatus of the present invention, and one embodiment of the force imparting means to connect respective sections of the connection apparatus.
Figure 7:
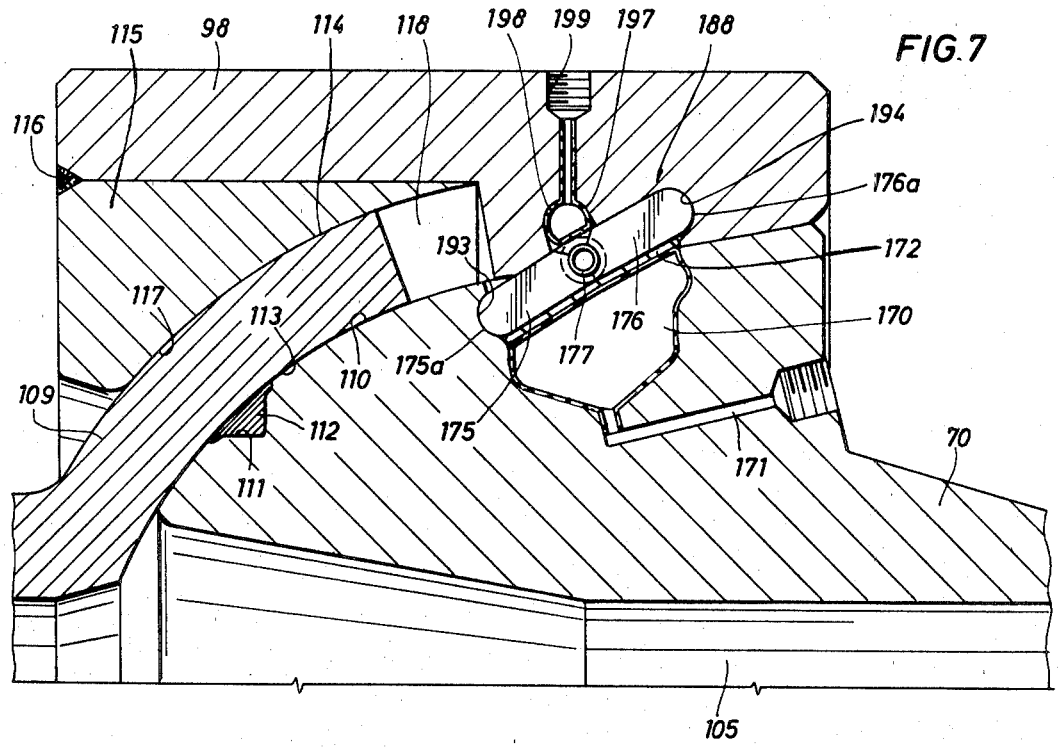
FIG. 7 is a view similar to FIG. 6 showing the connection force imparting means in an articulated condition and the connection apparatus sealed.
Figure 10:
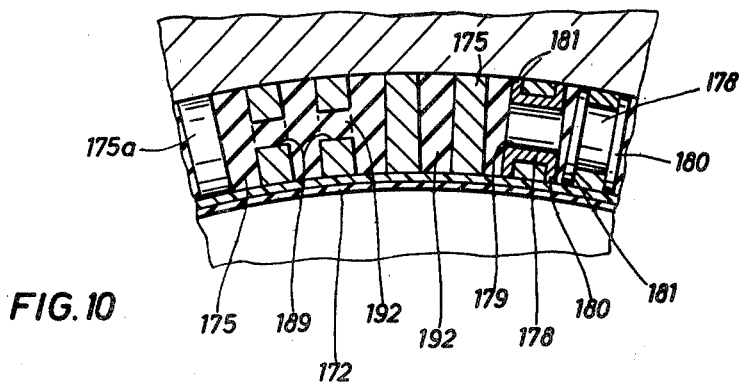
FIG. 10 is an exploded, perspective view of a toggle joint assembly used in the force imparting means of the connection apparatus of the present invention.

Reference is now made to FIGS. 6 and 7 for a detailed description of one embodiment of the force imparting means used in the boltless connection assemblies of the present invention. While the discussion which follows will deal with reference to a boltless connection assembly providing universal type movement, it is to be understood and readily apparent that the force imparting apparatuses described hereafter can be used with the boltless connection assembly 14 shown in FIG. 1. Referring then to FIG. 6, it is seen that recess 106 of male portion 70 is provided with an annularly extending inflatable bladder 170, bladder 170 being inflatable by means of a communicating port 171 extending through the exterior of male portion 70. An annular, flexible breaker belt 172 overlies bladder 170. As seen, bladder 170 is in the radially innermost portion of recess 106. Disposed in the radially outermost portion of recess 106 is the force imparting apparatus denoted generally as 46 in FIG. 1. The construction of a typical force imparting apparatus is best shown by reference to FIGS. 10-12. Looking first at FIG. 10 it can be seen that the force imparting apparatus can take the form of a toggle joint shown generally as 177. Each toggle joint 177 is seen to consist of toggle arms 175 and 176 and a pivot member in the form of a spool 177a having a cylindrical body portion 178, an axial bore 179 extending therethrough, and a pair of rims 180 and 181 extending radially outwardly from axially opposite ends of body portion 178. Toggle arms 175 and 176 are provided with arcuate recesses 182 and 183, respectively, in the ends thereof which engage spool 177a. Arcuate recesses 182 and 183 have a shape which matingly conforms to the external surface of cylindrical body portion 178 of spool member 177a. It can be seen that with arcuate recesses 182 and 183 engaged on spool 177a, arms 175 and 176 are permitted limited pivotable motion about spool 177a. Recess 182 is partially defined by fingers 184 and 185 which partially encircle the cylindrical body portion 178 of spool 177a when the toggle joint 177 is assembled. Likewise, recess 183 is defined by fingers 186 and 187 which also partially encircle cylindrical body 178 of spool member 177a when the toggle joint 177 is assembled. As can be seen, fingers 185 and 187 extend axially from arms 175 and 176, respectively farther than fingers 184 and 186. Thus, when the toggle joint 177 is assembled, arms 175 and 176 can be pivoted between two terminal positions. In one terminal position, fingers 184 and 186 will be in abutment while in the second terminal position, fingers 185 and 187 will be in abutment. It will also be observed that the end 175a and 176a of arms 175 and 176, respectively, are arcuate, generally having a circular outer surface.

In the preferred embodiment, the toggle joint 177 is constructed such that when fingers 184 and 186 are in abutment, the toggle joint has a V-shape, arms 175 and 176 being at a first angle to one another. This position corresponds to the uncocked position as will be seen more fully hereafter. In the preferred embodiment, when toggle arms 175 and 176 are pivoted until arms 185 and 187 are in abutment, toggle arms 175 and 176 will now be at a second angle to one another which is in the opposite direction and much larger than the angle formed when fingers 184 and 186 are in abutment. More specifically, toggle arms 175 and 176, when fingers 185 and 187 are in abutment, will be slightly "overcenter", the position in which the toggle joint 177 is exerting near maximum force.

Preferably spool member 177 is constructed of a spring material having elastic properties such that if force is applied to arms 175 and 176 in the direction shown by arrows C and D, respectively, cylindrical body member 178 will be compressed in a direction transverse to axial bore 179 making bore 179 slightly oval in configuration. Provided the elastic limit of the material of spool 177a is not exceeded, spool 177a will of course exert force in the directions opposite to those indicated by arrows C and D.

Figure 11:
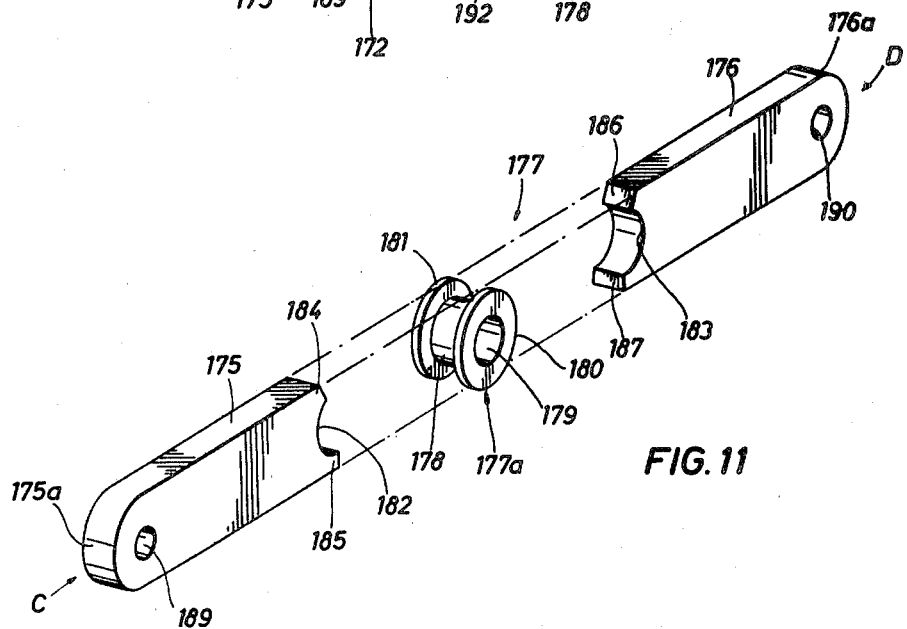
FIG. 11 is a partial, perspective view of a biasing belt used as part of the force imparting means in the connection apparatus shown in FIG. 6 and employing the toggle joint assembly shown in FIG. 10.
Figure 12:
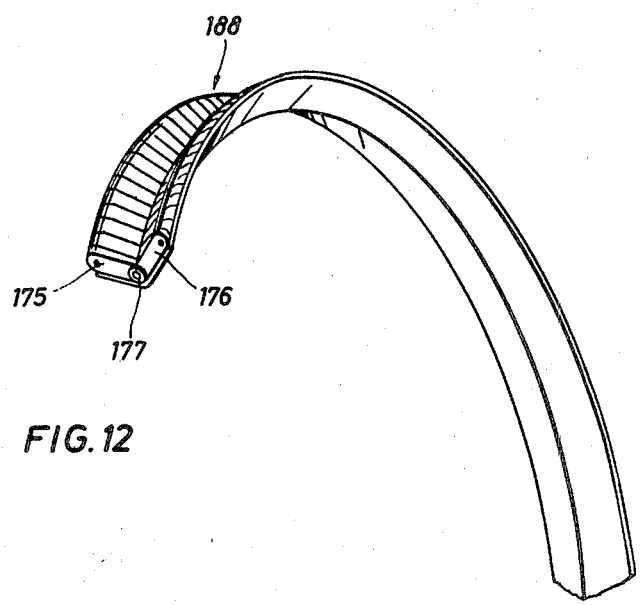
FIG. 12 is a cross-sectional view showing the interconnection of the toggle joints shown in FIG. 10 to form the biasing belt shown in FIG. 11.

While individual toggle joints can be used in the connection apparatus of the present invention, preferably the toggle joint will be assembled into a belt such as shown in FIG. 11 and in greater detail in FIG. 12. As shown in FIG. 11, a plurality of toggle joints 177 can be formed into a V-belt 188 with fingers 184 and 186 in abutment whereby the toggle joint 177 is in the uncocked position. The assembly of V-belt 188 is best shown by reference to FIGS. 10 and 12 where it is seen that a plurality of toggle joints 177 can be formed into an expandable belt using an elastomeric material 192 to hold the toggle joints 177 together. As seen, a series of individual, circumferentially disposed toggle joints 177 are bonded together by an elastomeric material 192, holes 189 and 190 in arms 175 and 176 serving to provide channels for interconnecting segments of the elastomeric material 192 between adjacent toggle joints 177. Also shown molded onto the inner circumference of V-belt 188 is breaker belt 172. Breaker belt 172 can, of course, be a separate member.

Returning now to FIG. 6 it will be apparent that, before male head portion 70 is fitted into female portion 98, V-belt 188 is slipped over male portion 70 and into recess 106. In this configuration V-belt 188 is substantially wholly confined in recess 106 in male portion 70. It will also be observed that the arcuate end portion 175a of arm 175 is in engagement with a bearing surface 193 forming part of recess 106. Bearing surface 193 serves as a pivot point about which arm 175 moves as will be shown hereafter.

Once V-belt 188 has been installed in recess 106, female portion 98 is then slipped over male portion 70 bringing recess 106 and 107 into register. Socket forming member 109 is then brought into engagement with surface 110 of male portion 70. Wedge ring 115 is then secured to female portion 98 by weld 116. At this point, socket forming member 109 is still free to articulate or move in a generally universal fashion with regard to male portion 70. Thus, accomodation for misalignment between the conduit to which socket forming member 109 is connected and the member to which male portion 70 is connected can be made. It should also be observed that at this point deformable seal member 112 has not been engaged.

Once proper alignment of socket forming member 109 is achieved, it is securely locked in place as follows: using port 171 in male portion 70, bladder 170 is inflated with a suitable inflating medium. The inflation of bladder 170 causes the arcuate end 175a of toggle arm 175 to pivot about bearing surface 193. At the same time, toggle arms 175 and 176 pivot about spool 177a and are forced radially outward to a position where they are in alignment. Further expansion of bladder 170 forces toggle arms 175 and 176 into the position shown in FIG. 7. At this point, fingers 182 and 183 of toggle arms 175 and 176 are in engagement, i.e. toggle arms 175 and 176 are at an angle to one another, the angle being much greater but opposite in direction to that shown in FIG. 6. In this condition, end surface 175a of toggle arm 175 is in engagement with bearing surface 193 in recess 106 of male portion 70 while end surface 176a of toggle arm 176 is in engagement with bearing surface 194 in recess 107 in female portion 98. Since spool 177a is a spring it will be apparent that toggle arms 175 and 176 are exerting a force against surfaces 193 and 194, respectively, the force being proportional to the amount of compression of spool spring 177a. The force exerted by toggle joints 177 forces suitable stop surfaces in male portion 70 and female portion 98 into engagement, such surfaces, for example being shown in engagement at 103.

As shown in FIG. 7, toggle arms 175 and 176 are "overcenter", i.e. they are not in parallel alignment. Being overcenter in the cocked position, toggle joints 177 will remain in a position urging suitable stop surfaces in female portion 98 and male portion 70 together without the application of force from bladder 170. At the same time, annular wedge ring 115, being secured to female portion 98, will force socket forming member 109 against segmental spherical surface 110 of male portion 70. This will result in a deformation of the deformable, preferably metal, seal means 112. Preferably, the volume of deformable seal receiving recess 111 is slightly larger than the volume of deformable seal 112, such that deformable seal 112 will flow to completely fill recess 112 and provide a fluid tight seal between male portion 70 and socket forming member 109. When seal 112 has been thus deformed, socket member 109 is locked in position and cannot be moved.

If it is now desired to separate male portion 70 and female portion 98, it is necessary to release toggle joint 177, i.e. to place the joints in the uncocked position shown in FIG. 6. This is accomplished in the following manner: communicating with recess 107 in female portion 98 is an annular, radially inwardly extending recess 197. Disposed in recess 197 is an annular release bladder 198 which can be inflated via a port 199 extending through female portion 98. With bladder 170 deflated, if bladder 198 is inflated it will snap toggle point 177 back "overcenter", i.e. into the configuration shown in FIG. 6. This will relieve the forces urging male portion 70 and female portion 98 together and permit disassembly of the connection apparatus.

Figure 8:
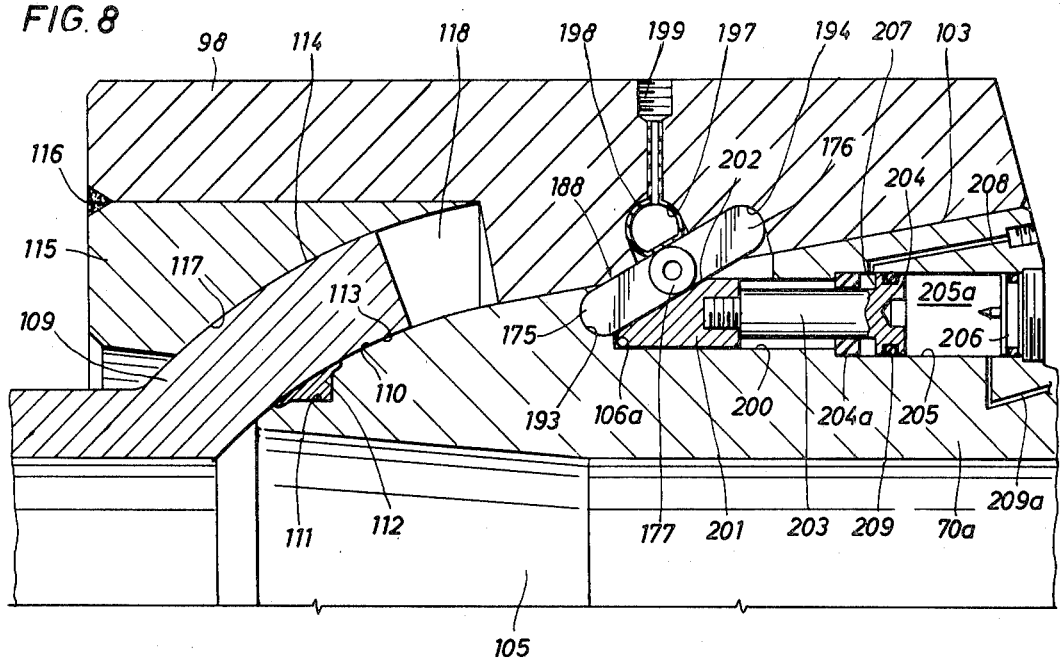
FIG. 8 is a view similar to FIG. 6 showing another embodiment of the force imparting means used for sealing the connection apparatus of the present invention.

Referring now to FIG. 8 there is shown a slightly modified embodiment of a means to actuate V-belt 188. In the embodiment shown in FIG. 8, male portion 70a is slightly different from male portion 70 shown in FIGS. 6 and 7. Male portion 70a has a recess 106a generally corresponding to recess 106 shown in FIGS. 6 and 7, recess 106 being in register with a recess corresponding to recess 107 in female portion 98. Communicating with recess 106a is an annular, generally axially extending recess 200. Slidably received in recess 200 is an annular member 201 having a conical conical surface 202. Threadedly secured, on one end, to annular member 201 is a piston rod 203 which extends through a seal member 204 and is affixed on its other end to piston 204. Piston 204 is slidably disposed in a piston cylinder 205 for reciprocal movement therein in response to the suitable application of hydraulic fluid, seal ring 209 providing fluid tight sealing between piston 204a and the walls of piston cylinder 205. A threaded plug 206 closes off piston cylinder 205 forming a first chamber 205a between plug 206 and piston 204. A passageway 208 leads from a second chamber 207 formed between piston 204a and seal 204 to the exterior of male portion 70a. Chamber 205a is in communication with a passageway 209a leading to the exterior of male portion 70a. It can be seen that if hydraulic fluid is supplied to chamber 205a, piston 204 will be urged axially inwardly toward recess 106a. This will result in the axially inward movement of piston rod 204 and annular member 201. If sufficient pressure is supplied to chamber 205a, conical surface 202 of annular member 201 will engage V-belt 188, forcing it into the cocked configuration, i.e. with toggle arms 175 and 176, engaging surfaces 193 and 194 in male and female portions 70a and 98, respectively. As in the case of the embodiment shown in FIG. 7, toggle arms 175 and 176 will be overcenter. Likewise, seal 112 will have deformed sealing and locking socket forming members 109 and male member 70a together. To uncock V-belt 188, hydraulic fluid is now supplied to chamber 207 moving piston 204a axially outwardly and retracting annular member 201 into annular recess 200. Inflation of bladder 198 via port 199 will now force V-belt 188 back overcenter into the general configuration shown in FIG. 6, i.e. with fingers 184 and 186 in abutment. Thus, the force tending to urge the stop surfaces, as for example at 103, in male portion 70a and female portion 98 together will be removed and the apparatus can be disassembled.

It will be appreciated that there will be a plurality of the piston-cylinder systems shown in FIG. 8 and described above, such plurality being circumferentially spaced in male portion 70a. Also, preferably, the systems will be capable of simultaneous actuation whereby substantially equal forces will be applied axially around the circumference of annular member 201 to prevent member 201 from becoming cocked in recess 200.

Figure 9:
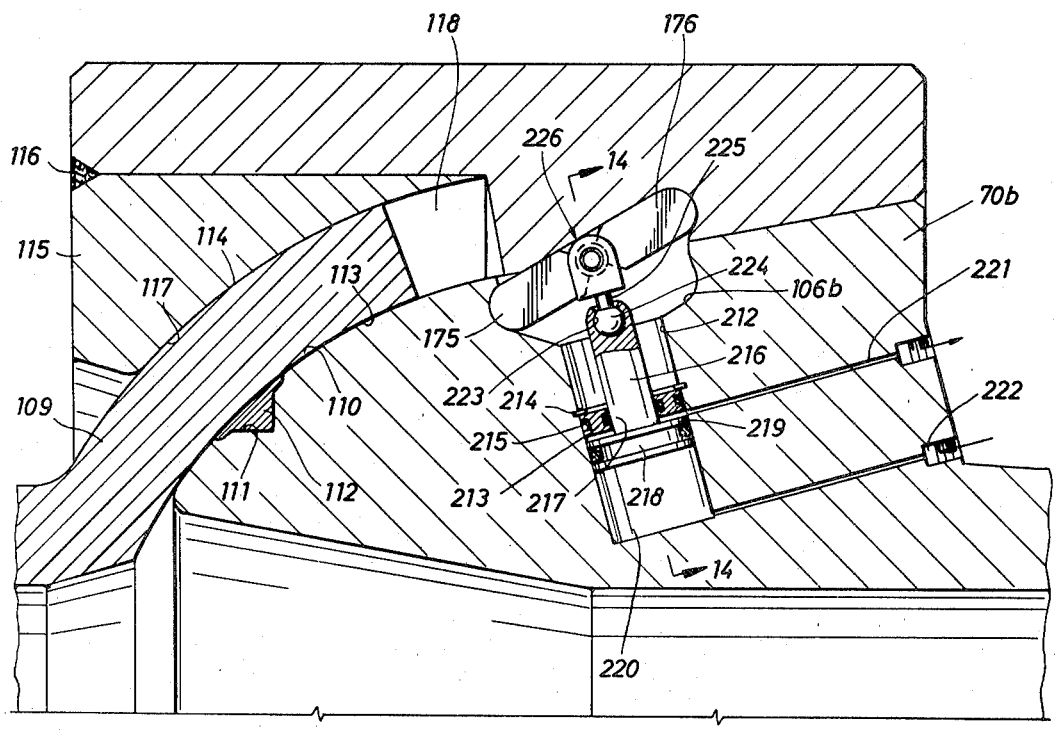
FIG. 9 is a view similar to FIG. 6 showing still another embodiment of the force imparting means for sealing the connection apparatus of the present invention.

Referring now to FIG. 9 there is shown still another force imparting means for urging the male and female members of the connection assembly into sealing engagement. In the embodiment shown in FIG. 9, recess 106b, which is similar to recess 106 shown in FIG. 6, is in open communication with a series of generally radially extending chambers 212 circumferentially spaced around male portion 70b. A guide member 213 is secured in chambers 212 by means of a snap ring 214, sealing between chamber 212 and the exterior of guide member 213 being accomplished by O-ring 215. Slidably disposed in a central aperture in guide member 213 is a piston rod 216, sealing between rod 216 and the aperture being accomplished by seal ring 217. Piston rod 216 is secured on one end to piston 218. Piston 218 serves to divide the radially outermost portion of chambers 212 into chambers 219 and chambers 220, chamber 219 being supplied with hydraulic fluid via port 221, chamber 220 being supplied with hydraulic fluid via port 222. It can be seen that if fluid is supplied to chamber 219, piston 218 will move in a direction shown by arrow E whereas if fluid is supplied to chamber 220, piston 218 will move in a direction opposite to that shown by arrow E.

Figure 14:
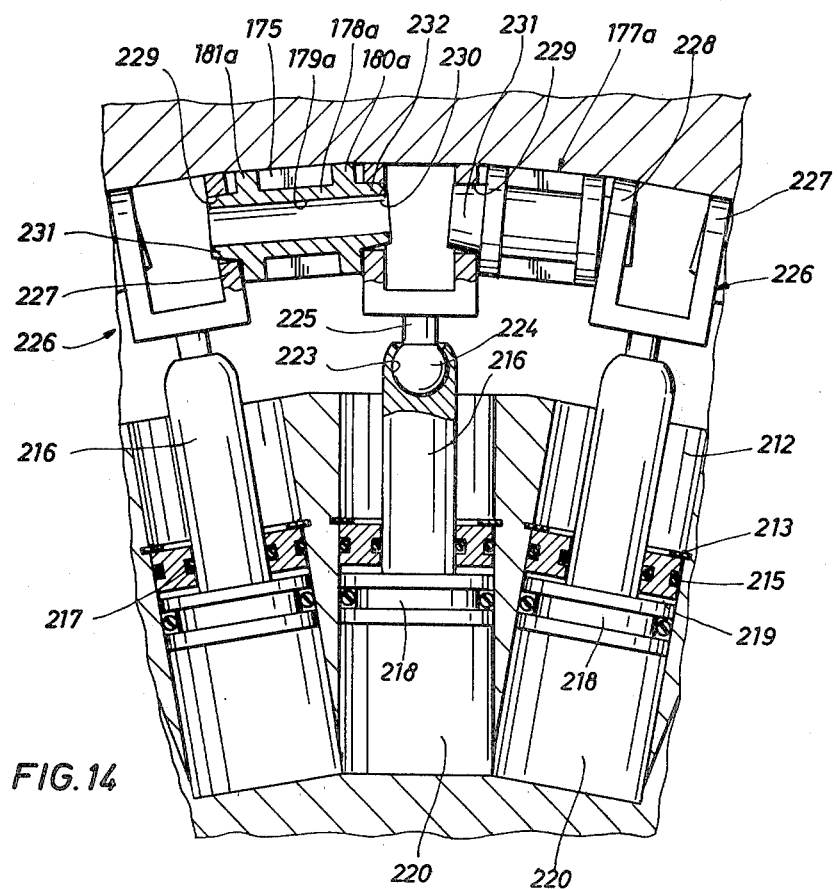
FIG. 14 is a view taken along the lines 14—14 of FIG. 9.

The end of piston rod 216 distal piston 218 forms a socket 223 in which is received a ball 224. Ball 224 is connected to a rod 225 which in turn is connected to a clevis member 226. Clevis member 226, as best seen in FIG. 14, has spaced arms 227 and 228 having holes 229 and 230, respectively. In the embodiment shown in FIGS. 9 and 14, spool members 177a are slightly different from those shown in FIG. 10. In addition to cylindrical body portion 178a, rims 180a and 181a and bore 170a, spool 177a is provided with axially projecting hubs 231 and 232. As can be seen with reference to FIG. 14, hub 231 extends into hole 229 of arm 227 of clevis 226 while hub 232 extends into hold 230 of arm 228 of clevis 226. It can thus be seen that spools 177a are alternately, circumferentially positioned between alternate, circumferentially spaced clevis members 226. Since pistons 218 can be operated simultaneously, it will be seen that spools 177a will all be simultaneously moved radially outwardly or radially inwardly depending upon the direction of movement of pistons 218. This will of course effect movement of toggle arms 175 and 176 into and out of the cocked and uncocked position as described above.

While in the embodiments shown in FIGS. 6, 8 and 9, the toggle joints 177 are shown as mounted on annularly extending recesses in the male portion of the joint connecting apparatus, it is to be understood that individual toggle joints could be mounted in individual, circumferentially spaced recesses in the male member, the female member being provided with registering recesses when the male and female members were mated. In such cases, each toggle joint would preferably be actuated simultaneously but individually to effect the cocking and uncocking and hence engagement and disengagement of the stop surfaces in the male and female portions of the joint connection apparatus.

While the detailed description of the force imparting means, i.e. the toggle joints of the present invention, has been made with particular reference to a connection assembly providing universal type movement, i.e. connection apparatus 18 shown in FIG. 1, it will be apparent that the force imparting means, i.e. the toggle joint assemblies shown in the embodiments of FIGS. 6, 7, 8 and 9 can be equally adapted to a non-articulating connection assembly such as assembly 14 shown in FIG. 1. Thus for example, any of the toggle joint assemblies and means for actuating same could be used in precisely the same manner as described for the embodiment for FIGS. 6, 7, 8 and 9 to urge male body 34 and female body 20 together until suitable stop surfaces therein were engaged.

In the above description of the toggle joints 177, particular reference was made to the fact that spool 177a is preferably made of a spring like material possessing sufficient elasticity so that it can be deformed to a certain extent without taking a permanent set. It is to be understood, however, that the construction of the spool or pivot member used in toggle joints 177 is not limited to material possessing the degree of elasticity described above, i.e. springs. For example, the pivot member could be formed from a substantially inelastic material and could, in fact, be a solid member having no axial bore therethrough as shown for spool 177a. In such a case, the length of the toggle joint, when the arms were in the aligned position, i.e. parallel, would have to be greater than the distance between the bearing surfaces formed in the registering recesses of the male and female portions of the connection apparatus against which the ends of the toggle arms bear when the male and female members were fully engaged. Additionally, it would be necessary to maintain a force on the toggle joints generally transverse to the long axis thereof to constantly urge the ends of the toggle arms into engagement with the bearing surfaces in the recesses in the male and female bodies to effect tight engagement of the stop surfaces of the male and female portions of the joint connection apparatus. The use, therefore, of a spring like material to form the pivot member of the toggle joint is greatly preferred since the energy stored in the compressed spring when the toggle joint is cocked acts to exert a constant force urging the stop surfaces in the male and female portions into engagement. The use of a spring as a pivot member has several other advantages. For one, the machining tolerances of the components need not be so closely maintained since the elastic quality of the pivot member can accomodate for a certain amount of variation in the tolerances. Additionally, when the toggle joint employs a spring as a pivot member, the connection joint can expand and contract without the loss of a seal, the spring compressing or expanding to compensate for any dimensional changes occurring because of heating, cooling or pressure changes in the system. Lastly, it is to be observed that unless the pivot member is made of a spring material, it is not possible to cock the toggle joints in the overcenter position in the manner described above. In this regard it is to be observed that as the toggle joints move from the uncocked position to the overcenter position, the spring member is compressed, i.e. it assumes a more oval configuration. If the pivot member were made of an inelastic material, it would not be possible to move the toggle joints to the overcenter, cocked position and still hold the male and female bodies into tight engagement. For example, if the length between the bearing surfaces in the recesses of the male and female portions is less than the axial length of the nonresilient toggle joints when the arms are in parallel alignment, the bearing ends of the toggle arms would dig into the bearing surfaces when the nonresilient toggle joints were moved into parallel alignment. Further movement of the nonresilient toggle joints radially outwardly would result in movement of the bearing ends of the toggle arms away from the bearing surfaces in the male and female portions. Thus, at that point there would be no force being exerted by the toggle joints forcing the male and female bodies into engagement.

While in the preferred embodiment described above, the pivot member of the toggle joint forms the elastic biasing means, it is possible that the toggle joints could be constructed such that one or both of the toggle arms, rather than the pivot member, provided the elastic or spring qualities. For example, the bearing ends of the toggle arms could be provided with resiliently biased rollers, ball bearings, plungers, etc., which could be compressed into the axial ends of the toggle arms but, because of a biasing means internally of the toggle arms would effect much the same action as described above for the toggle joints wherein the pivot member is a spring. In general, it is only necessary that the toggle joints be provided with a biasing means which provides a toggle joint having an elastic quality, i.e. a toggle joint which can be axially compressed when the toggle arms are in the parallel position, without taking a permanent set or deformation.

I claim:

1. A connection apparatus for connecting first and second tubular members comprising:
  a female body having a passageway therethrough and first and second ends defining first and second end openings, said female body having an internally formed bearing surface, the second end of said female body being adapted to be connected to said second tubular member;
  a male body having a passageway therethrough and first and second ends, said male body having an externally formed bearing surface, said first end of said male body being adapted to be connected to said first tubular member, said second end of said male body being received in said first end opening of said female body;
  force imparting means disposed between said male and female bodies selectively operate to force said male body into said female body, said force imparting means comprising toggle joint said toggle joint including first and second toggle arms, each of said toggle arms having a free end, said toggle joint being movable between a first position in which said first and second arms are at a first angle to one another to a second position in which said first and second arms are at a second, larger angle to one another, and the free end of said first arm is in engagement with said internally formed bearing surface in said female body and the free end of said second arm is in engagement with said externally formed bearing surface on said male body.

2. The apparatus of claim 1 including seal means disposed between said famale body and said male body.

3. The apparatus of claim 1 wherein said toggle joint includes a pivot member, said toggle joint being axially, elastically compressible.

4. The apparatus of claim 3 wherein said pivot member comprises a spring means, said spring means being compressed between said arms when said toggle joint is in said second position.

5. The apparatus of claim 4 wherein said spring means comprises a spool member having a cylindrical body with an axial bore therethrough, the ends of said arms pivotable on said spool having arcuate recesses shaped to matingly engage said outer cylindrical surface of said spool member.

6. The apparatus of claim 1 wherein said toggle joint includes a pivot member and means for moving said toggle joint from said first position to said second position, said toggle joint being axially, elastically compressible.

7. The apparatus of claim 6 wherein said pivot member comprises a spring means, said spring means being compressed between said arms when said toggle joint is in said second position.

8. The apparatus of claim 4 wherein said spring means comprises a spool member having a cylindrical body with an axial bore therethrough, the ends of said arms pivotable on said spool having arcuate recesses shaped to matingly engage said outer cylindrical surface of said spool member.

9. The apparatus of claim 6 including means for moving said toggle joint from said second position to said first position.

10. The apparatus of claim 1 wherein said female body has an internal, annular generally radially extending recess and said male body has an external, annular generally radially extending recess, said recesses in said male and female bodies being generally in register when said male body is received in said female body and wherein there are a plurality of circumferentially spaced toggle joints.

11. The apparatus of claim 1 wherein there are a plurality of circumferentially spaced toggle joints, said toggle joint including a pivot member.

12. The apparatus of claim 11 wherein said pivot member comprises a spring means, said spring means being compressed between said arms when said toggle joint is in said second position.

13. The apparatus of claim 12 wherein said spring means comprises a spool member having a cylindrical body with an axial bore therethrough, the ends of said arms pivotable on said spool having arcuate recesses shaped to matingly engage the outer cylindrical surface of said spool member.

14. The apparatus of claim 1 wherein said force imparting means comprises a biasing belt of said toggle joints adjoined by an elastomeric material.

15. The apparatus of claim 14 including means for deforming said belt radially outwardly whereby said toggle joints are moved to said second position.

16. The apparatus of claim 15 including an annular inflatable setting bladder means disposed radially inwardly of said belt.

17. The apparatus of claim 16 including means for inflating said bladder means to deform said belt radially outwardly whereby said toggle joints are moved to said second position.

18. The apparatus of claim 15 including means to deform said belt radially inwardly whereby said toggle joints are moved to said first position.

19. The apparatus of claim 18 wherein said means for deforming said belt radially inwardly includes an annular, inflatable release bladder means.

20. The apparatus of claim 16 including an elastomeric breaker belt disposed between said setting bladder means and said belt.

21. The apparatus of claim 15 wherein said means for deforming said belt radially outwardly includes a rigid annular member slidably disposed in an annular, generally, axial recess and means for urging said annular member out of said axial recess, said annular member being shaped so as to deform said belt into said second position.

22. The apparatus of claim 21 wherein said means for urging said annular member from said axial recess into said radially extending recess in said male body comprises a plurality of hydraulically operated piston-cylinder systems operatively connected to said annular member and disposed in said male body.

23. The apparatus of claim 21 including means to deform said belt radially inwardly whereby said toggle joints are moved to said first position.

24. The apparatus of claim 10 including a series of circumferentially spaced generally, radially extending cylindrical chambers in open communication with said radially extending recess in said male body, piston means disposed in said chambers, means for reciprocating said piston means in said chambers, and means connecting said piston means to said toggle joints whereby said toggle joints can be moved between said first and second positions.

25. The apparatus of claim 24 wherein said toggle joints include a spool member said spool members being provided with axially extending hubs at each end thereof, said spool members being circumferentially disposed in closely adjacent hub to hub relationship to one another, said means connecting said piston with said toggle joints comprising a plurality of piston rods having one end connected to the hubs of adjacent spool members, the other end of said piston rod being connected by a ball-socket arrangement to said piston means.

26. The apparatus of claim 25 including hydraulic power means to effect reciprocal movement of said piston means.

27. An apparatus for connecting first and second conduits comprising;
a slip joint having first and second tubular members disposed in telescopic relationship to one another;
connecting means adapted to be connected to one of said first or second tubular members and one of said first or second conduits for connecting said slip joint to said one conduit, said connecting means comprising:
a female body having a passageway therethrough and first and second ends defining first and second end openings respectively, said female body having an internally formed bearing surface, the second end of said female body being adapted to be connected to said second tubular member;
a male body having a passageway therethrough and first and second ends, said male body having an externally formed bearing surface, said first end of said male body being adapted to be connected to said first tubular member, said second end of said male body being received in said first end opening of said female body;

force imparting means disposed between said male and female bodies selectively operative to force said male body into said female body, said force imparting means comprising a toggle joint said toggle joint including first and second toggle arms, each of said toggle arms having a free end, said toggle joint being movable between a first position in which said first and second arms are at a first angle to one another to a second position in which said first and second arms are at a second, larger angle to one another, and the free end of said first arm is in engagement with said internally formed bearing surface in said female body and the free end of said second arm is in engagement with said externally formed bearing surface on said male body.

28. The apparatus of claim 27 including means disposed between said first and second tubular members to selectively fix said first and second tubular member against relative axial movement.

* * * * *